May 19, 1942.   L. HOLLAND-LETZ   2,283,633
AUTOMATIC UNIFORM STEP TEMPERATURE REGULATOR
Filed March 21, 1940   2 Sheets-Sheet 1
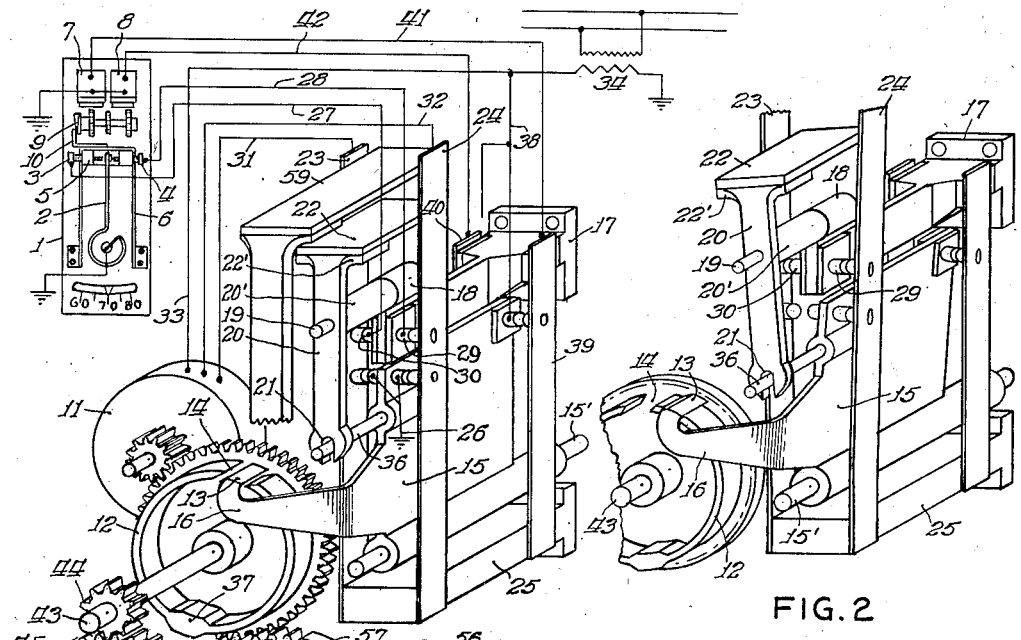
FIG. 2
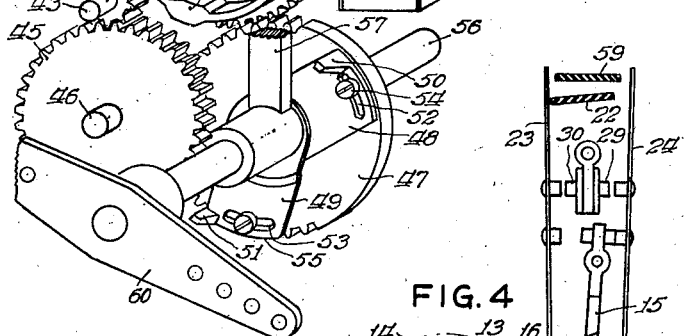
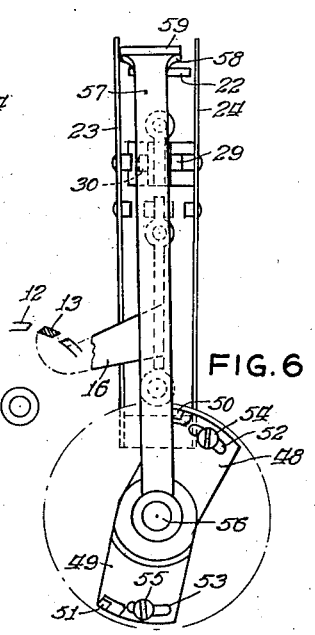
FIG. 4
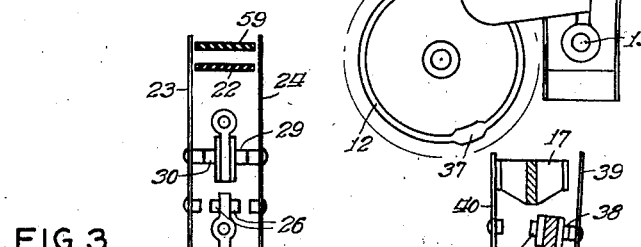
FIG. 6
FIG. 3
FIG. 5
INVENTOR
Ludwig Holland-Letz

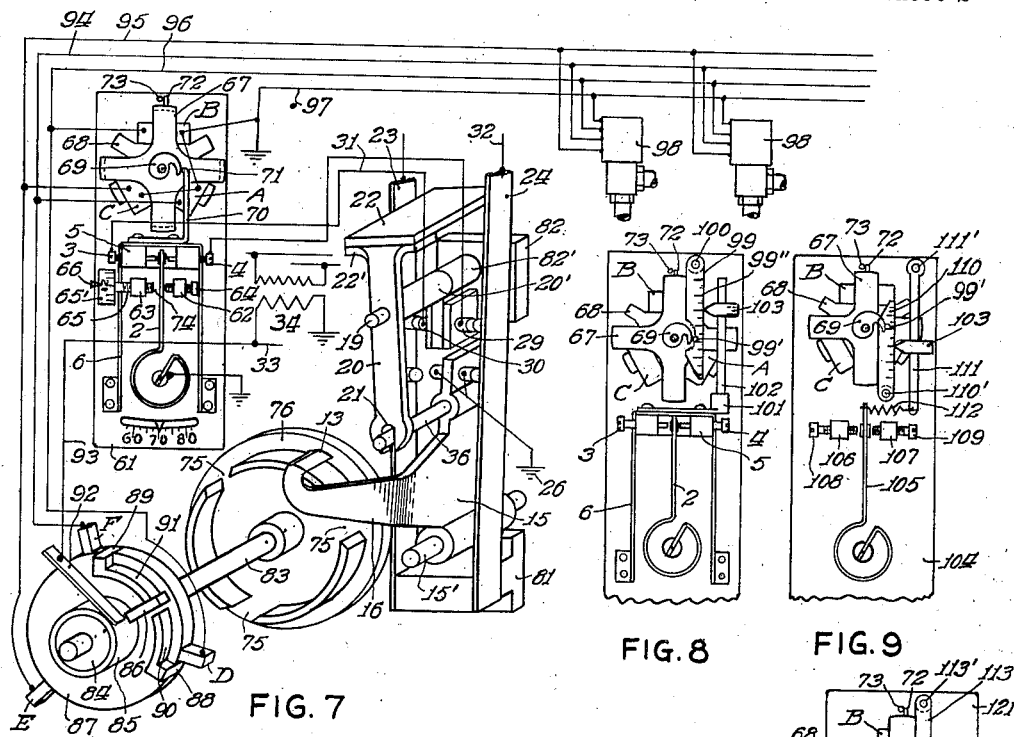

Patented May 19, 1942

2,283,633

UNITED STATES PATENT OFFICE 2,283,633

AUTOMATIC UNIFORM STEP TEMPERATURE REGULATOR

Ludwig Holland-Letz, Crown Point, Ind.

Application March 21, 1940, Serial No. 325,158

21 Claims. (Cl. 236—76)

This invention relates to improvements in automatic temperature regulators, particularly to one that will regulate by selecting any one of a series of uniformly stepped positions of a predetermined limit to limit movement and establish such stop positions of temperature changing means as are commensurate with the temperature demands and by keeping this step movement limit within the predetermined temperature range and thereby automatically finding a correctly calibrated position for governing the temperature; instead of governing with the conventional two stage regulating positions of either one of the two opposite limits.

This invention further relates to low voltage automatic temperature regulation, utilizing the common bi-metal type of thermal member; this is made possible by contacting only for initiating the start of each step, and not allowing the thermal member to carry an extended operating load; thus all foreign heat caused by arcing and current load which will effect the natural position of this thermal member, is reduced to a minimum; thereby making this inexpensive, simple but extremely sensitive bi-metal thermal member available for producing a very high order of temperature regulation.

A further object of this invention provides a simple, inexpensive, practical and compact temperature regulator for homes, offices, et cetera and still retain many of the valuable features of my copending patent application Ser. No. 148,091, filed June 14, 1937, issued July 2, 1940, as Patent No. 2,206,566.

Pursuant with the use of a series of uniform steps of my regulator, another object of this invention provides for the more extensive use of the uniform step by step motor to operate in the same circuit with the thermostat step motor, which I use for separating the thermal member contact while a uniform step is in progress. A step motor equipped thermostat is shown in my above mentioned copending patent application (Patent No. 2,206,566), additional step motors operating in the same circuit may be used for regulating valves; for radiators, liquid or gas fuels, speed reducers for affecting temperature changes, rheostats, et cetera; and thereby forming very inexpensive individual heating or temperature regulator systems from central control sources.

Another object of this invention provides for a step limit travel control adjustable in the thermostat for controlling the travel limit and regulator number of steps of all the step motors in that circuit.

Another object of this invention provides for a simpler means for affecting the separation of the thermal contact of the thermostat control by the use of a thermal compensator spring and using rigid terminal instead of swinging thermal contacts.

This invention further provides a compound lever for adjusting the step motor cam movement for changing the temperature range that lies within the limit to limit movement of the regulating means without changing the predetermined number of steps.

While reference to temperature or heat regulation is shown and described, it is obvious that by substituting such respective responsive means or member in place of the bimetal responsive means or member, regulation for controlling air conditioning or proportioning any other medium is within the scope of this invention, and which may be operated directly from the power control shaft or through step motor operated regulators in circuit with the thermostat step motor, which will be later described.

To further describe my invention more fully reference will be made to the accompanying drawings, in which:

Figure 1 is a dilated perspective diagram of my improved automatic temperature regulator, it showing this step producing power means (regulator) controlled by and in circuit with the same ratchet-step motor equipped thermostat that is shown in my above mentioned pending patent application (Patent No. 2,206,566), being shown for comparative and its simplicity reasons.

Figure 2 is a partial view of Figure 1, is also a dilated perspective diagram and shows the position of parts just after the motor has started on its journey of a step; the thermal member is thereby removed from the circuit.

Figure 3 is a partial cross sectional view showing the switch rocker in the neutral position of the step indexing ring cam.

Figure 4 is a partial cross sectional view of the step indexing ring cam and switch rocker shown in the started position, as of Figure 2.

Figure 5 is a partial cross section of the step indexing ring cam and the switch rocker in the position for energizing the ratchet step by step motor of the thermostat.

Figure 6 is a partial view showing the switch rocker and ring cam in neutral position with the control shaft at an extreme travel limit position and holding the travel arm against a contact leaf spring; thus preventing any further thermal response for movement in the latter direction.

Figure 7 is a dilated perspective view of my automatic temperature regulator showing the uniform step producing power device operating, a new type distributing switch and is shown in circuit with a plurality of my new external rotor step motors of which; one is in the thermostat while the others are shown operating valves. The thermostat is here shown equipped with an adjustable stop for predetermining the number of steps that the step motors shall operate.

Figures 8, 9 and 10 show plan views of thermostats equipped with outside rotor step motors, they are shown having various forms of thermal control adjustments and will be described in detail later.

Figures 11 and 12 show special step motor thermal contact separating cams.

Figure 13 of the drawings shows a cross section of the V point rest of Figures 8 and 9.

Figure 14 shows an enlarged partial sectional side elevation view of the step motor operated valve, as shown in Figure 7; but with the cover housing removed.

Figure 15 is a top view of the step motor of Figure 14 and is shown with the circuit connections.

Figure 16 is a side view of the thermostat as is shown in plan view of Figure 7.

Figure 17 shows a cross section of the distributor switch of Figure 7 and is shown just ahead of the distributor disc bar.

Referring to Figure 1 of the drawings, this invention relates to low voltage automatic temperature regulation, particularly to regulating drafts and dampers of hard fuel burning heating plants, and is of an improved simplified, compact, construction, adapted especially for small installations suitable for homes, offices, etc., being less expensive than that shown in my above mentioned patent application. The thermostat control containing the thermal responsive means or member for cooperating with opposing contacts, these are arranged to swing laterally for breaking contact sometime during a step, this is done by a step motor operating in either direction, this entire thermostat control as is here shown is an outline of the same one shown in Patent No. 2,206,566, it having a base 1 a thermal member 2 secured and grounded thereto, and which cooperates with a pair of terminals screws 3 and 4, these screws are in threaded engagement with a bifurcated terminal block 5, this block is made of insulating material and is secured to a laterally swinging U shape frame 6 which is secured to base 1.

A uniform step by step reversing motor comprising a pair of electro-magnets 7 and 8 secured to the base, each having armatures in ratchet wheel engagement and associated with means to cause a helical faced cam 9 to rotate one ratchet tooth in one direction when an impulse is received by one of the electro-magnets, and rotate one ratchet tooth in the other direction when the other electro-magnet receives an impulse thereby causing a step by step movement in either direction; this will cause the cam 9 to be rotated in steps accordingly and with it a U frame 6 which is sprung so as to cause an arm 10 which is secured to upper end of the U frame, to ride the cam and carry the frame with the terminal screws 3 and 4 swinging laterally in a parallel path to cooperate with the thermal member 2. No further description will be necessary since it is clearly shown and described in the former application, Patent No. 2,206,566.

The step producing power means will now be described: a motor 11 which is geared to a step indexing ring cam 12, this ring cam forms an inner and an outer path for a switch rocker finger 13 to ride against while a step is in progress; a switch rocker 15 is swingingly supported on a pivot 15', it is provided with a right angle extension 16 to which the finger 13 is an integral part. This finger is set in parallel alignment with the ring cam axis. The ring cam is provided with a neutral position 14 which is an interruption of the ring having inclining opposed sharp edges forming lines of equal tangents, the finger 13 is provided with correspondingly shaped edges so that when this finger is aligned with the ring cam and it is rotated counterclockwise the finger will take the outer path and when the ring cam is rotated clockwise the finger will take the inner path.

A motor leaf spring contact support bracket 17, is provided at its outer end with a cylindrical head 18 and having an aperture for securely holding a pivot 19, this pivot hingedly fulcrums a sleeve 20' which is an integral part of a throw out rocker 20 and which is provided with a slot 21 at its lower end, and to a right angle extension 22' at the upper end a plate 22 made of insulating material is secured, the inner end of the plate 22 extending back so as to interposingly engage a pair of leaf springs 23 and 24, the lower end of these leaf springs are secured to a bracket 25 which is made of insulating material, this bracket and bracket 17 are suitably secured to the housing which is not shown.

Leaf springs 23 and 24 are electrically grounded when they are engaged by a switch rocker 15, these leaf springs are sprung toward one other so as to rest firmly upon a pair of respective insulated contacts 30 and 29. The contact 30 is in circuit with thermal screw 3 through a lead 27, and contact 29 with thermal screw 4 by a lead 28; the motor leaf springs 23 and 24 are connected so as to cause reverse rotation of motor 11 by a pair of leads 31 and 32 respectively, and a lead 33 completes the motor circuit to the transformer 34. The switch rocker is provided with a pin 36 for engaging the slot 21 of the throw out rocker 20 so that any motion to the switch rocker is transferred to the throw out rocker and vis a vis by the spring action of leaf springs 23 and 24.

From the description of the step producing power device just made it is now easy to see that, a circuit is made from the motor to the thermal contacts 3 and 4 respectively through the leads 31 and 32 connected with the leaf springs 23 and 24 when contacting with either 30 or 29, when the switch rocker is moved from the neutral position; the neutral position is when the finger 13 is in the open position 14 of the ring cam as is shown in Figure 3; now if a thermal contact is made at 4 the leaf spring 24 through lead 32 to the motor will cause the motor to start rotating the ring cam counterclockwise, assuming that the motor is so wired, this will lift the switch rocker finger 13 to the outside of the ring cam path and thereby swing the switch rocker and cause ground to leaf spring 24 rotating the ring cam into the position shown in Figures 2 and 4 and simultaneously the pin 36 engaging slot 21 has moved the rocker 20 and forced plate 22 against leaf spring 23 moving it away from contact 30 simultaneously the switch rocker severs contact 29—24; and thereby the thermal member 2 has been completely cut from the circuit: nothing can now interrupt the progress of this step until one complete revolution of the ring cam neutral position is again in line with the finger 13 allowing the switch rocker to swing back to neutral, referring to Figure 5, but while this step was in progress about one-half complete, a ring cam raise 37 will have approached the finger and caused an additional clockwise rock to the switch rocker 15 and cause a contact 38 to meet a step motor leaf spring 39, and through lead 41 energize step motor electro-magnet 7 rotating cam 9 one step so as to cause the swinging U frame 6 to move contact 4 away from thermal member 2 causing a contact separation, or a contact mitigation as the case may be, and if there has been a separation, then after the ring cam has completed that revolution the motor will stop at the neutral position; because no signal was awaiting the motor leaf springs which are now resting upon their respective contacts 29 and 30 these have forced the switch rocker 15 into neutral position through the aid of plate 22 of the rocker 20: if however a contact between terminal 4 and thermal member 2 still existed, another step of the motor operated ring cam will be made in that same counterclockwise direction and this will be repeated until the thermal member 2 has been freed from contact: or if a call came from terminal 3 the leaf spring 23 through lead 27 and motor lead 31 will cause the motor to start the ring cam in the clockwise direction and pull the switch rocker finger 13 to the inside path of the ring cam moving the switch rocker to the left, grounding leaf spring 23, and with the aid of 20 and 22 separate 24 from 29, and when the ring cam raise 37 engages a step motor leaf spring 40 will cause an impulse through a lead 42 to energize electro-magnet 8 and cause the cam 9 to rotate one step and move the U frame 6 away from contact 3 and if a separation has taken place between 3 and 2 the motor will stop when the ring cam reaches the neutral position.

My regulator as stated above regulates through a series of uniform steps operating back and forth between predetermined limits, the ring cam 12 is secure to a shaft 43 upon which a pinion 44 is secured, this pinion is in mesh with a gear 45 and is secured to a shaft 46 upon which is a pinion, not shown, meshing in a gear quadrant 47 to which a pair of stop plates 48 and 49 are secured, these carry stops 50 and 51 respectively, plates 48 and 49 are provided with slots 52 and 53 respectively for providing adjustment for these stops and are held secured by screws 54 and 55 respectively, clearly shown in Figures 6 and 1.

Gear quadrant 47 is mounted and secured to a shaft 56 to which a control arm 60 is also secured which serves as a connecting means for regulating drafts, dampers for heating plants or other regulating devices: upon this shaft 56 a travel limit arm 57 is swingingly pivoted; to a right angle extension 58 formed at the upper end of this arm a plate 59 made of insulating material is secured, the end of this plate interposes leaf springs 23 and 24 serving to bear against either of these leaf springs and holding them away from their respective contacts 29 or 30 when either of the stops 50 or 51 of the quadrant 47 have reached their respective opposite travel limit. The screws 54 and 55 serve for holding the arm 57 in a position so as to hold the leaf springs 23 or 24 out of contact with 30 or 29 respectively when the switch rocker finger 13 is in the neutral ring cam position, and also adjusted so that this limit to limit movement will constitute the predetermined number of steps. It is obvious that when the gear quadrant 47 reaches either limit that the arm 57 prevents any further thermal contact to effect further movement of the regulator in that respective direction and can only travel in the opposite direction, to that other limit. It is obvious that the adjustment 54 and 55 can be used for changing the desired number of steps.

Having described my improved simple, compact, low voltage, automatic temperature regulator equipped with an electro-magnet ratchet operated thermostat step motor for separating the thermal contact, applicant will now describe this same improved regulator equipped with his new external rotor annular type step motor energized by his new distributor switch, an application for patent (Serial No. 325,156, filed Mar. 21, 1940) covering this new step motor and distributor switch has been filed; therefore such part pertaining thereto will only be briefly described in the following:

In Figure 7 of the drawings, the external rotor step motor equipped regulator thermostat control is shown comprising a base 61 with a thermal member 2 secured and grounded thereto, a laterally swinging U shaped frame secured at its lower end to the base and the upper end is fitted with a bifurcated block 5 made of insulating material, a pair of terminal contact screws 3 and 4 are in threaded engagement with block 5 and cooperate with the thermal member, a pair of posts 62 and 63 are mounted upon the base disposed adjacent to and interposed by the thermal member blade located near the terminal screws and secured to the base, the upper end of the posts are provided with threaded adjusting screws 64 and 65 for limiting the lateral thermal blade movement, the screw 65 at the left is shown having a graduated cylindrical head 65' adjacent to which a pointer 66 is secured to the base 61.

The step motor having an external rotor 67 provided with four depending arms is secured to a shaft not shown, a three coil consequent pole stator 68 rotatably supporting the rotor is secured to the base 61, the stator is provided with three coils A, B and C, a spiral cam 69 is mounted upon the rotor shaft extending above its upper surface, a nose 71 on an arm 70 extending above and is secured to the end of the U frame 6, the U frame is sprung so as to cause the upper end of this arm with its nose 71 to ride on the center line of the spiral cam surface so that when the rotor is rotated the U frame will swing laterally and thereby cooperate with the thermal member 2 through a parallel path during its operation.

The step motor rotor is provided with a stop pin 72 projecting radially from the lower end of one of its depending arms, a second pin 73 mounted vertically upon the base 61 for engaging the stop pin 72 forming a stop for the rotor when the spiral cam is in its extreme counterclockwise position while a rotor arm is in alignment with coil B of the stator poles, at this the travel limit position the large end of the cam 69 should be adjacent the nose 71 the screw 64 is then adjusted so as to contact the thermal member blade 2 and slightly move it away from the terminal screw 4 to prevent contact and now the rotor is rotated to the opposite extreme position of stop pins 72 and 73 the screw 65 is also adjusted to slightly relieve the contact of terminal screw 3, the graduated cylindrical head of screw 65 should then show a graduated position of 12 steps at the pointer 66 position, it may now be mentioned that this step motor having a four arms rotor will make 12 equally divided steps per revolution when it is energized with my distributor switch, which will be explained later, the screw 65 is provided with a thread pitch exceeding the total space 74 between the end of the terminal screw and the thermal member and this will represent one revolution of the step motor, each graduation can represent one step, it is obvious that some automatic simple notched spring locking means could be provided, each notch representing a step if so desired, but has not been shown for illustrative simplicity reasons. It is now obvious if the regulator were in operation and that if the screw 65 is turned one half way towards the thermal member, only one half the number of steps will be made by the step motor, and if turned all the way in, it would make the thermal member inoperative and regulator would be motionless.

The motor 11 has been omitted in Figure 7 since this step producing power device is similar to Figure 1. A step indexing ring cam 76 is operated by a motor 11 not shown, this ring cam is provided with three neutral stop positions or ring interruptions 75 and are shaped the same as those shown in Figure 1 including the entire front portion of the switch rocker and therefore will not be described in detail, a switch rocker finger 13, extending at right angles to an arm 16, which in turn is an integral part of a switch rocker 15 and which rocks on pivot 15' for support.

A pin 36 secured in a cylindrical formed part of the switch rocker 15 this also carries ground contacts and is exactly as in Figure 1, also the throw out rocker 20 having a slot 21 provided with a right angle extension 22' for securing the extension plate 22 which interposingly engages the motor leaf springs 23 and 24 contacting respectively with 30 and 29 and these contacts are insulatingly mounted upon a contact bracket 82 to which the pin 19 is secured in the cylindrical portion 82' an integral part of the bracket, all operations are identical as far as the motor device and thermal control is concerned, no limit travel control has been shown because the limit control here is in the thermostat, however when this type of thermostat control is not used the same limit control as shown in Figure 1 may be used. The motor leaf springs 23 and 24 are also sprung towards each other and secured to the insulating block 81 as in Figure 1.

Describing the distributor switch; the step indexing ring cam 76 is mounted secured to shaft 83, an insulating bushing 84 within a sleeve portion 85 of a radially extending drive arm 86 is securely held to the shaft, a distributor disc 87 made of insulating material is rotatably mounted upon the shaft adjacent the drive arm 86 and is laterally supported by collar 87' and secured to shaft as is clearly shown in Figure 17, a pair of opposing straddle contact bars 88 and 89 are embedded in slots provided for them in distributor disc 87 and these bars come flush to and forming a smooth periphery for the disc, a pair of interposing segments 90 and 91 are an integral part of the respective bars 88 and 89, the inner opposing ends form a slot of a width slightly wider that the thickness of the drive arm 86 so that when a counterclockwise rotation of the drive arm member will drive, it will contact segment 91; and clockwise rotation of the arm will drive by contacting segment 90. The bars 88 and 89 of the disc 87 are here shown having a 120 degree spacing so as to correspond with a set of three equally spaced brushes D, E and F disposed around and resting upon the periphery of the disc and are suitably mounted in the housing so as to make a firm yielding contact with the disc and thereby also resisting the rotation of the disc by the brush friction to establish a firm contact between the drive arm 86 and 88 or 89. The collector brush 92 contacting the sleeve 85 make circuit through lead 93 to the transformer, a lead 94 connects brush F with the step motor coil A, a lead 95 connects brush E with step motor coil C, and a lead 96 connects brush D with the step motor coil B, these leads also continue on and serve two step motors 98 which are shown regulating valves that may be used for radiators, liquid fuel burner control, et cetera, this valve regulating motor will be further described later.

To further describe the operation of the distributor switch for energizing the step motors, the ring cam is shown rotating counterclockwise operating in an uncompleted step, the drive arm 86, (which is being rotated by the shaft 83) is in contact with segment 91 which is an integral part of bar 89, this bar is now approaching brush F which is connected through lead 94 to coil A, and as bar 89 passes brush F the coil A of the step motor is energized causing a pair of the rotor arms nearest to move in line with coil A pole, this will be one step in a clockwise direction, thereby moving the cam 69 and through it the U frame 6 laterally effecting contact with 2; since the operation results of the step motor cam in connection with the thermal member is the same here as in Figure 1 no further descriptive repetition in that connection will be made; when the ring cam 76 neutral position 75 reaches the switch rocker finger 13 the motor leaf springs 23 and 24 will force the switch rocker finger down into the ring cam neutral position 75 then the motor and ring cam will stop; the switch rocker is forced into neutral position due to the pressure of the leaf springs interconnection with the throw out rocker 20 through plate 22 and through the switch rocker ground contact resting against 24 interconnected with pin 36 engaging slot 21; if another signal was received for movement of cam in the same direction; the bar 89 will meet brush E and cause coil C to be energized through lead 95, and cause another pair of rotor arms to line up with coil C, and which will cause another step in that same direction. Now if a signal came from the thermal member for movement of the ring cam in the opposite direction; the distributor drive arm 86 will contact with segment 90, after having made two step in clockwise direction, this arm 86 will now be located between brushes E and D and the bar 88 which is in contact with arm 86 will be between E and F so that the clockwise movement will bring the bar 88 in contact with brush F energizing coil A again and bring the rotor back one step again and if another step was to follow the coil B would be energized through brush D and bring the rotor arm back into the original position against the stops as shown in the drawing of Figure 7. It will now be seen that by aid of the straddle interposed drive contact of this distributor the correct consecutive selections of the stator pole coils is made when reverse rotations take place, only one pair of poles are energized for each step.

The Figure 7 regulator just described, may equally well use regulating means operated directly from the control shaft as is shown in Figure 1, however as it is here shown, regulation is through step motor operated valves and these are operated by the same distributor switch circuit in which the thermostat step motor is energized from, these step motor operated regulators may be controlling temperature or conditioning through valves, speed changers, dampers, etc.

Having described the two types of automatic regulators, the first using a reciprocating type step motor equipped thermostat, the latter an annular type step motor equipped theremostat, applicant will now describe various additional features embodied in these thermostat controls.

Figure 8 of the drawings, is a thermostat very similar to that shown in Figure 7 but without the adjustable travel limit step control stops, and it has the added feature of an adjustment for changing the lead of the step motor cam for the purpose of changing the temperature range lying within the limit to limit movement of the regulator, most all the other parts are alike, therefore only the new parts will be explained retaining such numerals where parts are alike. The spiral cam 69 lead movement has been made adjustable by adding a pivoted follower bar 99 which is shown having graduations 99'', projecting from the lower side of this follower bar is a pin 99' which rides the cam, this follower bar is pivoted on pin 100 secured to base above the step motor, a bracket 101 is secured to the upper end of the laterally swinging U frame which is provided with an extension bar 102 in parallel alignment with follower bar 99, the extension bar is provided with a slidingly mounted V point rest 103 which is provided with an aperture for receiving a clamp spring 103' held in the aperture by a burred inner edge, shown in Figure 13, this V point rest is slidably adjusted along the U frame extension bar 102 and offers means for changing the movement effect of the cam lead imposed upon the lateral swing movement of the U frame and the contact terminals carried by it, this variable movement will limit the lateral movement of the thermal blade and consequently the temperature range lying within that movement, and with this movement variable while the simultaneous movement of the regulator from limit to limit is constant explains why the temperature range is changeable without changing the number of steps, is possible with my regulator; this however is also shown by other means in my pending application Serial No. 148,091, filed June 14, 1937 (Patent No. 2,206,566).

Figure 9 of the drawings, is a simplified form of thermostat, here no laterally swinging thermal terminals are used, the contact terminals are here mounted rigidly upon a base 104, a thermal member 105 is secured and grounded to the base, a pair of terminal posts 106 and 107 are insulated and secured to the base adjacent to and interposed by the thermal blade near upper end, the posts are provided with a pair of terminal screws 108 and 109 in threaded engagement with the upper end and aligned with and for cooperating by contacting with the thermal member, this thermostat is shown having the same step motor as Figures 7 and 8 therefore no reference will be made to its detail, the step motor cam 69 operates through a pair of compound levers of which a follower bar 110 is a reverse duplicate of 99 in Figure 8, a pin 99', this pin projects from the lower side, rides the cam 69, a pivot 110' mounted vertically on the base serves as an oscillating fulcrum for the follower bar, a second pivot 111' secured vertically to the base above the step motor used to fulcrum an arm 111, this arm slidingly supports a V point rest 103 which is frictionally held by a spring 103', the lower end of the arm 111 is provided with a small hole for attaching a tension spring 112, this spring interposingly connects with the upper end of the thermal member and is of such strength as to equal the same difference of combined thermal spring force and movement of that of the thermal member at like temperature changes, i. e., the U frame lateral travel limit, say for two degrees of temperature range. It is therefore obvious that the same results are obtained from this type of thermostat as if a positive thermal terminal movement were employed, such as the U frame.

Another form of thermostat is shown in Figure 10, in action this thermostat is the same as that shown in Figure 7, both are provided with an adjustable step control, neither have temperature range control adjustment, as of Figure 9, a tension spring serves to separate the thermal contact during the progress of a step. The thermal member, terminal posts, and contact screws, step motor and cam are all same as of Figure 9 with the exception that the cam lead operates in the opposite direction, a pivoted arm 113 fulcrumed on a pin 113' mounted above the step motor on the base 121 rides the cam 69 shown resting on the inner end of the spiral face on a pin 99' projecting below the arm in an inward projecting ear, this arm is offset away from the center and is provided with a small hole for receiving a tension spring 114 and is interposingly connected to the upper end of the thermal member same as in Figure 9. An arm 115 is pivotly supported on pin 115' secured at the lower end to the base, this arm is provided with an extension 115'' passing to the left disposed beyond the thermal member to which are secured a pair of posts 117 and 118 positioned so as to straddle the thermal blade just below the terminal screws 108 and 109, these posts threadedly receive adjusting screws 64 and 65 respectively, upper end of the arm 115 is provided with a vertically extending pin 116 which rests against the outside lower end of the arm 113, a second tension spring 119 attached into a hole 119' in the inner center of arm 115 and is springly supported adjacently upon pin 120 in the base, this spring serves to hold this arm 115 and the arm 113 resting firmly with pin 99' resting against the cam 69. Since this thermostat is provided with the same step adjustment control as Figure 7 it will be unnecessary to again describe the adjustment screws 64 and 65 which has been covered under that description. In results, this thermostat just described will be precisely the same as that of Figure 7.

The various thermostats that I have now shown and described are shown for reasons of comparison, they embody many valuable practical features and it is also obvious that many other very broad departures can be made, such as, the thermal member could be made to operate in a vertical plane instead of the horizontal plane as do all that have been shown on these drawings, but in order to avoid confusion only the latter type have been shown.

To produce thermostat step motor motion for separating the thermal contact while a step is in progress, many kinds of mechanism may be substituted for the purpose; in this invention, cams that rotate have been shown for reasons of simplicity and for the varied results readily obtained. Figure 11 shows a cam having its two opposite operating limit provided with concentric surfaces each of 90 degrees angular spacing, and the central portion a spiral surface of 180 degrees; this form of movement offers, i. e., regulation for heating plants burning hard fuels where regulation of fire is through a draft and a check damper; after the first thermal signal, it would be very advantageous to have the open positions come to a near closed vent instantly, which would be concentric cam surfaces, and then followed by a number of gradual fine positions before complete closure is made for both the draft and check damper, which would be the central spiral portion of the cam surface. Compound cams could also be provided, in which, i. e., a construction using one cam course for regulation in one direction and another different cam course for regulation in the reverse direction. A two revolution cam could also be devised as is shown in drawings of Figure 12, a four arm rotor will cause 12 steps when energized with my distributor switch; obviously a two revolution cam will double the steps and so will an eight arm step motor rotor when using my distributor. It is therefore obvious that many form of cams may be devised. It must here be stated that the cams shown in these drawings are all of exaggerated lead dimensions to clearly illustrate its functions.

The step motor application to automatic uniform step regulation as applied to the valve, is important; referring to Figures 14, 15 and 7, valve 98 illustrates an external rotor step motor regulating a valve; the valve seat lifting operating mechanism detail shown convey no particular significance. The step motor is an enlargened view of those mounted on the thermostat, a three coil consequent pole stator 123 provided with an aperture, a shouldered sleeve bushing 124 having a threaded end, a spacer sleeve 125, a frame plate 126 provided with a central large aperture and two radially opposite small holes, these parts are assembled in the order mentioned and clamped together with nut 127 engaging the threaded sleeve. A rotor shaft 128 is provided with an interposed flange 128' passing through a hole in the axis of a rotor 129, the rotor is provided with four depending arms and is secured to shaft against the flange for keeping latter alignment, it is rotatably mounted in the stator sleeve bushing. A valve cap 131 provided with two threaded holes disposed in radial alignment having also a large central hole, a pair of spacer sleeves 130 fitting screws 130' the screws passing through holes in the motor frame plate 126 and the spacer sleeves then into the threaded valve cap holes for holding the assembled motor securely upon the valve cap. A valve body 133 interposed by a diaphragm 132 and secured to the valve cap by screws, not shown, which will seal the valve and hold it firmly together. A hollow cup threaded nut 134 having a shouldered threaded stud end passing through a hole in the center of the diaphragm and then secured to a partially shown valve disc 135 which in turn rests upon the valve seat, not shown, for regulating the flow opening of the valve. A threaded hollow screw 136 fitting the cup nut 134 is mounted on the lower end of the rotor shaft 128 and secured with the set screw 136'. A rotor stop is also provided similar to the stops 72 and 73, not shown in these step motor valve views, but are referred to Figures 7, 8, 9 or 10, when the rotor arm is at an extreme counterclockwise position and a rotor arm is adjacent and aligned with one of the stator poles the valve seat should be closed; this adjustment is made by adjusting the screw 136 in the proper position, then locking the set screw 136'. It can now be clearly seen that if the step motor rotor is rotated in the clockwise direction the valve will open and close with counterclockwise rotation, the step motor as shown will make 12 steps for one revolution, therefore will offer a 12 step selective graduated regulating adjustment when this step motor is operated in circuit of Figure 7 and it will find a correct adjusted position corresponding with the temperature requirement. Figure 15 is a top view of this valve step motor showing the circuit leads to the coils and correspond to the circuit of Figure 7. It is obvious that step motor operated valves as shown in the circuit of Figure 7 provides a very simple means for regulating the temperature of a room or a suite of rooms through any number of radiators receiving their heat supply from a common main, and these may all be controlled by one thermostat. It is also obvious that valves can also be regulated by an electro-magnet ratchet step motor energized and connected in the same circuit as of Figure 1 or in the circuit of Patent No. 2,206,566.

I have now shown and described many modifications of my improved automatic temperature regulator but various other modifications and changes may be made in this invention by those skilled in the art and therefore am only to be limited in accordance with the scope of the appended claims.

I claim as my invention:

1. In a control system, responsive means, power means, and regulating means adapted to be moved back and forth by said power means between predetermined limits constituting a predetermined number of a series of equally divided stepped positions, switching means, an electric circuit, said responsive means in said electric circuit to start said power means to operate a fraction of one of said equally divided stepped positions for moving said switching means, said switching means movement making circuit to operate said power means independent of said responsive means circuit to complete and insure the operation of the said started step of a series of equally divided step positions of said predetermined limits and simultaneously operate said regulating means.

2. In a control system, responsive means, power means, and regulating means adapted to be moved back and forth by said power means between predetermined limits constituting a predetermined number of a series of equally divided stepped positions, switching means, an electric circuit, said responsive means in said electric circuit to start said power means to operate a fraction of one of said equally divided stepped positions for moving said switching means, said switching means movement making circuit to operate said power means and said regulating means independent of said responsive means circuit for completing and insuring the operation of said started step of a series of equally divided steps of said predetermined limits and simultaneously render said responsive means circuit ineffective.

3. In a control system, responsive means, power means, and regulating means adapted to be moved back and forth by said power means between predetermined limits constituting a predetermined number of a series of equally divided stepped position, switching means, an electric circuit, said responsive means in said electric circuit to start said power means to operate a fraction of one of said equally divided stepped positions for moving said switching means, said switching means movement making circuit to operate said power means and said regulating means independent of said responsive means circuit for completing and insuring the operation of said started step of a series of equally divided steps of said predetermined limits and simultaneously render said responsive means circuit ineffective, and means for locking said switching means during the progress of each equal step movement to insure complete steps.

4. In a control system, responsive means, power means, and regulating means adapted to be moved back and forth by said power means between predetermined limits constituting a predetermined number of a series of equally divided stepped positions, switching means, an electric circuit, said responsive means in said electric circuit to start said power means to operate a fraction of one of said equally divided stepped positions for moving said switching means, said switching means movement making circuit to operate said power means and said regulating means independent of said responsive means circuit for completing and insuring the operation of said started step of a series of equally divided steps of said predetermined limits, said responsive means cooperating with circuit terminals, and means operated by said power means for moving means to break circuit of said responsive means and said terminals during the progress of each equally stepped positions.

5. In a control system, responsive means, power means, and regulating means adapted to be moved back and forth by said power means between predetermined limits constituting a predetermined number of a series of equally divided stepped positions, switching means, an electric circuit, said responsive means in said electric circuit to start said power means to operate a fraction of one of said equally divided stepped positions for moving said switching means, said switching means movement making circuit to operate said power means operating said regulating means independent of said responsive means circuit for completing and insuring the operation of said started step of said series of equally divided steps of said predetermined limits, said responsive means cooperating with circuit terminals, means operated by said power means for moving means to break circuit of said responsive means and said terminals during the progress of each equally stepped position, and means for varying the extent of movement to break circuit of said responsive means and said terminals without changing the number of said series of equally divided stepped position between predetermined limits.

6. In a heat control system, thermal responsive means, power means, and regulating means adapted to be moved back and forth by said power means between predetermined limits constituting a predetermined number of a series of equally divided stepped positions, switching means, an electric circuit, said thermal responsive means in said electric circuit to start said power means to operate a fraction of one of said equally divided stepped positions for moving said switching means, said switching means movement making circuit to operate said power means operating said regulating means independent of said thermal responsive means circuit for completing and insuring the operation of said started step of a series of equally divided steps of said predetermined limits, said thermal responsive means cooperating with circuit terminals, camming means, said camming means operated by said power means for moving means to break circuit of said thermal responsive means and said terminals during the progress of each equally stepped position, and means for varying the extent of said camming means movement to break circuit of said thermal responsive means and said terminals.

7. The combination with a heat control system, temperature sensitive means, power means, and regulating means adapted to be moved back and forth between predetermined limits constituting a predetermined number of a series of equally divided stepped positions, switching means, a circuit contact member cooperating with said temperature sensitive means, an electric circuit, said means sensitive to temperature changes in said electric circuit and having movement to cooperate with said circuit contact member for starting said power means for initiating said switching means to operate said power means and said regulating means through each one of said equal divisions of stepped movement of said predetermined limits, an electric step motor, a distributor switch, said distributor switch operated by said power means for energizing said step motor for moving means to separate said circuit contact of said temperature sensitive means during each of said equal step division of movement.

8. The combination with a heat control system, temperature sensitive means, power means, and regulating means adapted to be moved back and forth between predetermined limits constituting a predetermined number of a series of equally divided stepped positions, switching means, a circuit contact member cooperating with said temperature sensitive means, an electric circuit, said means sensitive to temperature changes in said electric and having movement to cooperate with said circuit contact member for starting said power means for initiating said switching means to operate said power means and said regulating means through each one of said equal divisions of stepped movement of said predetermined limits, a distributor switch, said distributor switch having a terminal change reverse selector member, an electric annular type step motor having at least three stator coils in circuit with said distributor switch operated by said power means for energizing said step motor for moving means to separate said circuit contact of said temperature sensitive means during each of said equal divisions of movement.

9. The combination with a heat control system, thermal responsive means, power means, and regulating means adapted to be moved back and forth between predetermined limits constituting a predetermined number of a series of equally divided stepped positions, switching means, a circuit contact member cooperating with said responsive means, an electric circuit, said thermal responsive means in said electric circuit and having movement to cooperate with said circuit contact member for starting said power means for initiating said switching means to operate said power means and said regulating means through each one of said equal divisions of stepped movement of said predetermined limits, an electric step motor, a distributor switch, said distributor switch operated by said power means for energizing said step motor for moving means to separate said circuit contact of said thermal responsive means during each one of said equal step divisions of movement, and stop means for limiting the travel of said step motor number of steps equal to that of the travel limit of said distributor switch and to its number of electrical impulses.

10. The combination with a heat control system, thermal responsive means, power means, and regulating means adapted to be moved back and forth between predetermined limits constituting a predetermined number of a series of equally divided stepped positions, switching means, a circuit contact member cooperating with said responsive means, an electric circuit, said responsive means in said electric circuit and having movement to cooperate with said circuit contact member for starting said power means for initiating said switching means to operate said power means and said regulating means through each one of said equal divisions of stepped movement of said predetermined limits, an electric step motor, a distributor switch, said distributor switch provided with a pair of interposing contacts, means operated by said power means for selecting either of said interposing contacts of said distributor switch for energizing said electric step motor for selecting movement in either direction and operate means to cause movement to separate contact of said thermal responsive means and said contact member during the progress of each equal division of stepped movement.

11. The combination with a heat control system, thermal responsive means, power means, and regulating means adapted to be moved back and forth between predetermined limits constituting a predetermined number of a series of equally divided stepped positions, switching means, a circuit contact member cooperating with said responsive means, an electric circuit, said responsive means in said electric circuit and having movement to cooperate with said circuit contact member for starting said power means for initiating said switching means to operate said power means and said regulating means through each one of said divisions of stepped movement of said predetermined limits, an electric step motor, said electric step motor having a stator provided with at least three stator poles, a rotor having bars traversing said stator magnetic field, a distributor switch, said distributor switch having a frictionally resisted terminal member provided with a pair of interposing terminals, driving means operated by said power means for selecting either of said interposing terminals for operating said step motor in reverse directions for causing movement to means for separating contact of said responsive means and said contact member during the progress of each equal division of stepped movement.

12. The combination with a heat control system, thermal responsive means, power means, and regulating means adapted to be moved back and forth between predetermined limits constituting a predetermined number of a series of equally divided stepped positions, switching means, a circuit contact member cooperating with said responsive means, an electric circuit, said responsive means in said electric circuit and having movement to cooperate with said circuit contact member for starting said power means for initiating said switching means to operate said power means and said regulating means through each one of said equal divisions of stepped movement of said predetermined limits, an electric step motor, said step motor having a stator provided with at least three stator poles, a rotor having bars traversing said stator magnetic field, a distributor switch, said distributor switch operated by said power means for energizing said step motor for moving means to separate said circuit contact of said responsive means during each of said equal step division of movement, and means for limiting the travel of said step motor number of steps to the travel limits of said distributor switch and to its number of electrical impulses.

13. The combination with a heat control system, responsive means, power means, and regulating means adapted to be moved back and forth between predetermined limits constituting a predetermined number of a series of equally divided stepped positions, switching means, a circuit contact member cooperating with said responsive means, an electric circuit, said responsive means in said electric circuit and having movement to cooperate with said circuit contact member for starting said power means for initiating said switching means to operate said power means and said regulating through each of said equal divisions of stepped movement of said predetermined limits, means operated by said power means for separating said circuit contact member and said responsive means during each of said divisions of stepped movement, and means for limiting the movement of said responsive means for determining said predetermined movement limit and said number of equally divided stepped positions through which said power means and said regulating means operate.

14. The combination with a control system, responsive means, power means, and regulating means adapted to be moved back and forth between predetermined limits constituting a predetermined number of a series of equally divided stepped positions, switching means, a circuit contact member for cooperating with said responsive means, an electric circuit, said responsive means in said electric circuit and having movement to cooperate with said circuit contact member for starting said power means for initiating said switching means to operate said power means and said regulating means through each of said equal division of stepped movement of said predetermined limits, means operated by said power means for separating said circuit contact member and said responsive means during each of said equal divisions of stepped movement, and means for limiting the movement of said responsive means for determining said predetermined movement limit and said number of equally divided stepped positions through which said power means and said regulating means operate, and means for changing said responsive means limited movement to a different limit for changing the said predetermined limits of a predetermined number of a series of equally divided stepped positions through which said power means and said regulating means operate to a different predetermined limit movement and number of step limit.

15. The combination with a control system, responsive means, power means, and regulating means adapted to be moved back and forth by said power means between predetermined limits constituting a predetermined number of a series of equally divided stepped positions, an electric circuit, switching means, said switching means comprising a cam means operated by said power means, said cam means having a neutral position, said responsive means in said electrical circuit associated with said neutral position to start said power means and said cam means to operate a fraction of one of said equally divided stepped position, said cam means affecting said switching means so as to operate said power means and said regulating means to complete the operation of the said started step of a series of equally divided stepped positions of said predetermined limits and simultaneously render said responsive means circuit ineffective.

16. The combination with a control system, responsive means, power means, and regulating means adapted to be moved back and forth by said power means between predetermined limits constituting a predetermined number of a series of equally divided step positions, an electric circuit, switching means, said switching means comprising a cam having a neutral position interposed by opposed positions, a switch rocker, said switch rocker provided with an engaging member normally resting in said neutral position, a pair of opposing power switches in said electric circuit interposed by said switch rocker for reversed operation of said power means, said responsive means in said electric circuit interposing said power switch circuits for starting said power means to operate through a fraction of one of said equally divided stepped position and cause said engaging member to select either of said opposed cam positions to complete the operation of said started step of a series of equally divided stepped positions of said predetermined limits and simultaneously said power switch to break said responsive means circuit during the completion of said equally divided step.

17. The combination with a control system, responsive means, power means, and regulating means adapted to be moved back and forth by said power means between predetermined limits constituting a predetermined number of a series of equally divided stepped positions, an electric circuit, switching means, said switching means comprising a cam having a neutral position interposed by opposed positions, a switch rocker, said switch rocker provided with an engaging member normally resting in said neutral cam position, a pair of opposing power switches in said electric circuit interposed by said switch rocker for reversed operation of said power means, said responsive means in said electric circuit interposing said power switch circuit for starting said power means to operate through a fraction of one of said equally divided stepped position and cause said engaging member to select either of said opposed cam positions to complete the operation of said started step of a series of equally divided stepped positions of said predetermined limits and simultaneously said power switch to break said responsive means circuit during the completion of said equally divided step, and limit stop means for holding either of said power switches open for limiting the movement of said regulating means to equal that of said predetermined limits by keeping the respective responsive means contacts ineffective.

18. The combination with a control system, responsive means, power means, and regulating means adapted to be moved back and forth by said power means between predetermined limits constituting a predetermined number of a series of equally divided stepped positions, an electric circuit, switching means, said switching means comprising a cam having a neutral position interposed by opposed positions, a switch rocker, said switch rocker provided with an engaging member normally resting in said neutral position, a pair of opposing power switches in said circuit interposed by said switch rocker for reverse operation of said power means, said opposed positions of said cam provided with an interrupted portion, a pair of opposed step motor switches interposed by said switch rocker, a reversable ratchet step motor comprising a pair of electro-magnets provided with armatures, said armatures having ratchet wheel engagement associated with a rotatable member, a circuit contact member, said circuit contact member cooperating with said responsive means and in said electric circuit interposing said power switch circuits for starting said power means to operate through a fraction of one of said equally divided stepped position and cause said engaging member to select either of said opposed cam positions to complete the operation of said started step of a series of equally divided steps and simultaneously said cam interrupted portion to move said switch rocker to momentarily close said step motor switch and cause an impulse in either of said electro-magnets and cause one step of movement of said rotatable member to cause movement to separate contact of said responsive means during the progress of each of said equal stepped position of said predetermined limits.

19. The combination with a control system, sponsive means, power means, and regulating means adapted to be moved back and forth between predetermined limits constituting a predetermined number of a series of equally divided stepped positions, switching means, circuit contacts, an electric circuit, said responsive means in said electric circuit having movement to cooperate with said circuit contacts for starting said power means for initiating said switching means to operate said power means and said regulating means for each one of said equal divisions of stepped movement of said predetermined limits, a step motor, energizing means, flexible compensating means operated by said step motor energized by said power means for moving means to separate said circuit contact of said responsive means during each of said equal step division of movement.

20. The combination with a control system, responsive means, power means, and regulating means adapated to be moved back and forth between predetermined limits constituting a predetermined number of a series of equally divided stepped positions, switching means, circuit contacts, an electric circuit, responsive means in said electric circuit and having movement to cooperate with said circuit contacts for starting said power means for initiating said switching means to operate said power means and said regulating means for each of said equal divisions of stepped movement of said predetermined limits, a plurality of electric step motors, said regulating means operated by some of said plurality of step motors, a distributor switch operated by said power means, one of said plurality of step motors for moving means to separate said circuit contact of said responsive means during each of said equal division of step movement, and circuit leads for connecting said distributor switch with said plurality of step motors.

21. In a control system, responsive means, power means, and regulating means adapted to be moved back and forth between predetermined limits constituting a predetermined number of a series of equally divided stepped positions, switching means, circuit contacts, an electric circuit, said responsive means in said electric circuit to cooperate with said circuit contacts for starting said power means for initiating said switching means to operate said power means and said regulating means for each of said equal divisions of stepped movement of said predetermined limits, flexible compensating contact separating means, means for moving said flexible compensating contact separating means operated by said power means for separating said circuit contact from said responsive means during each of said equal divisions of step movement, and means for changing the amount of said flexible compensating means movement for separating said circuit contact from said responsive means without changing said predetermined number of said series of equal steps and limits.

LUDWIG HOLLAND-LETZ.